(12) United States Patent
Hagiopol et al.

(10) Patent No.: US 8,557,925 B2
(45) Date of Patent: Oct. 15, 2013

(54) BLENDS OF ANIONIC COPOLYMERS SUITABLE FOR SURFACE SIZE AND METHODS OF MAKING THE SAME

(75) Inventors: Cornel Hagiopol, Lilburn, GA (US); James W. Johnston, Suwanee, GA (US); Sean M. Tyler, Beaverton, OR (US); Michael J. Bush, Spokane, WA (US)

(73) Assignee: Georgia-Pacific Chemicals LLC, Atlanta, GA (US)

( * ) Notice: Subject to any disclaimer, the term of this patent is extended or adjusted under 35 U.S.C. 154(b) by 678 days.

(21) Appl. No.: 12/038,250

(22) Filed: Feb. 27, 2008

(65) Prior Publication Data

US 2008/0214738 A1    Sep. 4, 2008

Related U.S. Application Data

(60) Provisional application No. 60/892,382, filed on Mar. 1, 2007.

(51) Int. Cl.
*C08L 25/08* (2006.01)
*C08L 23/08* (2006.01)

(52) U.S. Cl.
USPC ............................. 525/241; 525/221; 525/240

(58) Field of Classification Search
USPC ........ 525/221, 240, 241, 327.4, 327.8, 329.7, 525/330.2
See application file for complete search history.

(56) References Cited

U.S. PATENT DOCUMENTS

| 3,899,389 | A | * | 8/1975 | Vaughn et al. | ............. 162/168.6 |
| 4,839,077 | A | * | 6/1989 | Cramer et al. | ................ 510/373 |
| 5,716,707 | A | | 2/1998 | Mukaida et al. | |
| 5,993,604 | A | | 11/1999 | Finlayson et al. | |
| 6,054,526 | A | | 4/2000 | Betremieux et al. | |
| 6,087,457 | A | | 7/2000 | Tsai | |
| 6,407,197 | B1 | | 6/2002 | Van Den Berg et al. | |
| 6,482,886 | B1 | | 11/2002 | Finlayson et al. | |
| 6,734,232 | B2 | | 5/2004 | Hagiopol | |
| 6,830,657 | B1 | | 12/2004 | Betremieux et al. | |
| 6,939,441 | B2 | | 9/2005 | Nurminen et al. | |
| 2005/0022956 | A1 | | 2/2005 | Rodriguez et al. | |

OTHER PUBLICATIONS

PCT International Search Report, Jun. 27, 2008.

* cited by examiner

*Primary Examiner* — Irina S Zemel
*Assistant Examiner* — Jeffrey Lenihan
(74) *Attorney, Agent, or Firm* — Ram W. Sabnis

(57) ABSTRACT

A sizing composition comprises a blend of at least two anionic copolymers.

21 Claims, No Drawings

BLENDS OF ANIONIC COPOLYMERS SUITABLE FOR SURFACE SIZE AND METHODS OF MAKING THE SAME

CROSS-REFERENCE TO RELATED APPLICATION

This application claims the benefit of and incorporates by reference provisional application Ser. No. 60/892,382 filed Mar. 1, 2007.

BACKGROUND

The present disclosure generally relates to a surface size for cellulosic products, and more particularly, to blends of anionic copolymers suitable for surface size.

Paper and other cellulosic products often are sized, i.e., are treated by deposition of a composition to ameliorate characteristics related to the porosity and the hydrophobicity of the cellulosic product. Sizing typically is used to control absorption by the substrate of water, water-borne compositions, and inks. Sizing may be accomplished via an internal sizing process, a surface sizing process, or a combination of both.

In an internal sizing process sizing is initiated before the cellulosic product is completely formed. Internal sizing (also known as bulk sizing), is typically accomplished by adding an internal sizing agent directly to an aqueous pulp slurry such that the internal sizing agent coats the fibers of the pulp. Internal sizing agents are generally hydrophobic in nature, wherein their nonpolar portions are anchored to the surface of fibers and thereby retard water penetration when the fibers are completely formed or fabricated into the finished cellulosic product.

Surface sizing is also referred to as external, tub, or calendar sizing. In a surface sizing process, sizing agents are applied to at least one surface of the finished cellulosic product. More particularly, surface sizing occurs when a surface sizing material is applied to the surface of a fabricated cellulosic product and fills the capillaries of the product, thereby rendering water penetration more difficult. Surface sizing is generally less expensive than internal sizing, because almost the entire sizing agent is retained on the surface of the treated product.

While there are a variety of known sizing systems, a continual need exists for an external sizing system that provides improved sizing performance (e.g., higher Hercules Size Test (HST) values) over known sizing systems.

BRIEF SUMMARY

Disclosed herein are blends of anionic copolymers that are suitable for surface sizing paper and other cellulosic products, and methods of making the blends.

In one embodiment, a sizing composition comprises a blend of at least two anionic copolymers.

In one embodiment, a sizing composition comprises a blend of styrene copolymer and ethylene copolymer.

In one embodiment, a sizing composition comprises a blend of a styrene-maleic acid copolymer and an ethylene acrylic acid copolymer, wherein the styrene-maleic acid copolymer comprises about 50 weight percent to about 85 weight percent styrene, the styrene-maleic acid copolymer has a molecular weight of about 5,000 to about 200,000, and the ethylene acrylic acid copolymer has a molecular weight of about 2,000 to about 250,000 and comprises about 5 weight percent to about 45 weight percent acrylic acid.

In one embodiment, a sizing composition comprises a blend of a styrene-maleic acid copolymer, an ethylene acrylic acid copolymer and a styrene-acrylic ester dispersion, wherein the styrene-maleic acid copolymer comprises about 50 weight percent to about 85 weight percent styrene, the styrene-maleic acid copolymer has a molecular weight of about 5,000 to about 200,000, and the ethylene acrylic acid copolymer has a molecular weight of about 2,000 to about 250,000 and comprises about 5 weight percent to about 45 weight percent acrylic acid and the SAE copolymer has a styrene:acrylic ester mole ratio ranging from 1:9 to 9:1.

The above described and other features are exemplified by the following detailed description.

DETAILED DESCRIPTION

Disclosed herein are blends of anionic copolymers that are suitable for surface sizing paper and other cellulosic products, and methods of making the blends. For ease in discussion, anionic blends of styrene copolymers and ethylene copolymers are discussed in detail below. The blends of styrene copolymers and ethylene copolymers have improved sizing performance of styrene copolymers alone and ethylene copolymers alone that are used as sizing agents. In other words, it has been discovered that blends of styrene copolymers and ethylene copolymers have a synergetic effect that can improved sizing performance (e.g., higher Hercules Size Test (HST) values).

The Hercules Sizing Test (HST) measures the rate of penetration of a 1 percent formic acid dye solution, read at 80% reflectance, as the solution penetrates through the sized paper. Skilled practitioners recognize that the HST test, results reported as seconds, is a well-established test protocol for gauging the performance of a sized product. The test provides a relative evaluation of the hydophobicity of a sized substrate.

In general the higher the HST value, the better the hydrophobicity and water resistance. The blends disclosed herein can have an HST value greater than about 100, particularly greater than about 200, and even more particularly greater than about 600.

The term "polymer" as used herein refers to compounds having about ten or more monomer units, and is intended to include homopolymers as well as copolymers.

A sizing composition comprises a blend of styrene copolymer and ethylene copolymer. In one embodiment, the sizing composition comprises a blend of a styrene copolymer and an ethylene copolymer, wherein the styrene copolymer comprises about 50 weight percent to about 85 weight percent styrene, the styrene copolymer has a molecular weight of about 5,000 to about 200,000, and the ethylene copolymer has a molecular weight of about 2,000 to about 250,000 and comprises about 5 weight percent to about 45 weight percent acrylic acid.

While particular embodiments comprising styrene-maleic acid and ethylene-acrylic acid are referenced for ease in discussion, it is to be understood that this disclosure is not limited to blends comprising styrene-maleic acid and ethylene- acrylic acid. Rather in various embodiments, other copolymerizable, unsaturated acids may be employed rather than maleic acid and acrylic acid. For example, each copolymer can include maleic acid, itaconic acid, methacrylic acid, acrylic acid, and the like, as well as combinations comprising at least one of the foregoing. It is also to be understood that these anionic copolymers can be present in a solution or in a dispersion. These copolymers may be used as their salts, such as their ammonium salts.

In one embodiment, the ethylene copolymer comprises ethylene acrylic acid (also referred to as "EAA") copolymer. The ethylene copolymer may comprise about 55 weight percent to about 95 weight percent ethylene. The ethylene copolymer may comprise about 5 weight percent to about 45 weight percent acrylic acid. Weight percents are based on a total weight of the copolymer. The ethylene copolymer can have a molecular weight of about 2,000 to about 250,000. Like the styrene copolymer, the ethylene copolymer can be solublized by forming its ammonium salt in any manner known to skilled practitioner. Other salts of ethylene acrylic acid that are soluble in water include, but are not limited to, sodium and potassium salts of ethylene acrylic acid or blends thereof.

In one embodiment, the styrene copolymer comprises a styrene-maleic acid (also referred to as "SMA") copolymer. The styrene/maleic acid copolymer may comprise about 50 weight percent to about 85 weight percent styrene. The styrene/maleic acid copolymer may comprise about 15 weight percent to about 50 weight percent maleic acid. Weight percents are based on a total weight of the copolymer. The styrene copolymer can have a molecular weight of about 5,000 to about 200,000. The styrene copolymer can be solublized by forming its ammonium salt in any manner known to the skilled practitioner. Other salts of styrene-maleic acid that are soluble in water include, but are not limited to, sodium and potassium salts of styrene-maleic acid. Suitable SMA copolymers can include, but are not limited to, the SMA copolymers disclosed in U.S. Pat. No. 6,734,232, which is herein incorporated by reference in its entirety. Such copolymers are commercially available from Georgia-Pacific Resin LLC under the tradename Novacoate® 1936.

In one embodiment, a blend according to the present invention can be prepared simply by adding an ethylene-acrylic acid (EAA) copolymer to an SMA copolymer previously solubilized by forming an SMA ammonium salt with the addition of ammonia. For example, by adding about 1-5% by weight EAA copolymer, excess ammonia can be scavenged by the EAA copolymer forming ethylene-acrylic acid copolymer ammonium salt.

Styrene-maleic acid type copolymers also may include styrene-maleic acid half ester and styrene-maleic acid that is partially imidized. The degree of styrene-maleic acid imidization is about 25% to about 75% maleic acid units. The imidized styrene-maleic acid is a ternary copolymer: styrene, maleimide and amide- ammonium salt of maleic acid. In one embodiment, the blend can be made by mixing water dispersion of imidized SMA copolymer with water solution of ethylene acrylic acid type copolymer. In one embodiment, the SMA imidization occurs at a temperature of about 100° C. to about 140° C. and pressure of about 5 pounds per square inch gauge (psig) to about 200 psig and is performed in the presence of ethylene-acrylic acid copolymer ammonium salt. Suitable methods of SMA imidization include those methods disclosed in U.S. Pat. No. 6,407,197, which is herein incorporated by reference in its entirety. The imidization of styrene-maleic acid results in a higher free ammonia, because the ammonia is released during the imidization reaction. Fumaric acid rosin adduct can be used in these types of blends in an amount of about 0.5 weight percent to about 10 weight percent as an ammonia scavenger.

In one embodiment, a blend according to the present invention can be prepared simply by adding an ethylene-acrylic acid (EAA) copolymer to an SMA copolymer previously imidized in the manner described above. For example, by adding about 1-5% by weight EAA copolymer to the imidized SMA, ammonia released by the imidaztion reaction can be scavenged by the EAA copolymer forming ethylene-acrylic acid copolymer ammonium salt.

In a styrene-maleic acid copolymer and ethylene acrylic acid copolymer blend, the styrene-maleic acid copolymer may be present in the blend in an amount of about 1 weight percent to about 99 weight percent. In another embodiment, the ethylene acrylic acid copolymer blend may be present in an amount of about 1 weight percent to about 99 weight percent. Weight percents are based on a total weight of the copolymer.

In one embodiment, the sizing composition comprises a blend of the styrene-maleic acid copolymer and the ethylene acrylic acid copolymer, wherein the styrene-maleic acid copolymer copolymer comprises about 50 weight percent to about 85 weight percent styrene, the styrene-maleic acid copolymer has a molecular weight of about 5,000 to about 200,000, and the ethylene acrylic acid copolymer has a molecular weight of about 2,000 to about 250,000.

Each of these copolymers can be present in a water solution in an amount of about 10% to 40% of the solution. For example, in one embodiment of making the blend, a water solution of SMA type copolymer is blended with water solution of EAA type copolymer. In one embodiment, the blend can also be made by dissolving both SMA and EAA in one step using an appropriate hydroxide (e.g., ammonium, sodium, potassium or combinations comprising at least one of the foregoing) at a temperature of about 90° C. to 95° C. at a pressure of about 5 psig to about 25 psig for a period of time of about 3 hours to 20 hours, and often from about 3 hours to 4 hours.

In embodiments, the synergetic effect on sizing performance is still present in complex blends. For example, in one embodiment the sizing composition comprises a blend of SMA and EAA that also includes a styrene-acrylic ester dispersion (SAE). These blends can be obtained, for example, by mixing a SAE dispersion in SMA with EAA or by direct emulsion copolymerization of styrene-acrylic ester in the presence of water soluble form of SMA and EAA. For example a blend according to the present invention can be prepared by forming the SAE latex dispersion, via emulsion copolymerization, in the presence of a imidized SMA and EEA blend. The emulsion copolymerization is developed either in the presence of an emulsifier, or in the absence of any emulsifier and in the presence of water-soluble comonomers. The SAE copolymer typically has a styrene:acrylic ester mole ratio ranging from 1:9 to 9:1. SAE is a strong hydrophobic material and the particle stabilizer (SMA and EAA) is also a sizing agent.

Suitable water-soluble comonomers include, but are not limited to, p-styrene sulfonic acid, maleic acid (maleic anhydride), fumaric acid, itaconic acid, acrylic acid, methacylic acid, glycidyl methacrylate, allyl glycinyl ether, Sodium 1-allyloxy-2-hydroxypropyl sulfonate, acrylamide, and combinations or mixtures comprising at least one of the foregoing. In one embodiment, the water-soluble comonomer may be employed in an amount of about 0.1% to about 10%

In one embodiment, persulfate salts initiate the emulsion copolymerization of the blend of SMA/EAA with the styrene-acrylic ester dispersion (SAE), whether alone or in a redox system. The initiator may be present in an amount of 0.5% to about 3%, based on an entire amount of the polymerizable components. The SMA/EAA to SAE ratio can be about 0.1:1 to about 10:1. Thus, the continuous phase components and dispersed phase components are supplied in quantities and proportion to obtain the desired weight ratio while affording sufficient continuous phase sufficient to maintain a desired concentration and quantity of components. The reaction temperature may be set between about 25° C. and 90° C. The components can be added at the same time or semi-continuously in order, for example, to design a desired architecture of the copolymer.

In one embodiment, the resulting latex product comprises a particle size of 0.01 micrometers to 2.0 micrometers, a pH of about 7.5 to about 10, and a solids content of 15 weight percent to 50 weight percent, based on a relative concentration of components.

The sizing composition will generally be provided in an aqueous liquid vehicle, as an aqueous solution or dispersion, although small amounts of a water-soluble or water miscible organic solvent may also be present. It may on occasion be necessary to add a solubilizing compound during preparation of the sizing composition so that the components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations, and, if present, will generally represent not more than about 1.0 wt. % of the composition, and in most cases will represent not more than about 0.5 wt. % of the composition.

The size-press solution includes, along with the sizing compounds, the starch, which can be anionic, non-ionic or cationic. The starch concentration is about 1% to about 10% and the sizing agent concentration is about 0.1% to about 20% based on dry starch.

The specific techniques used to size paper and other cellulosic products such as cardboard, include, but are not limited to, those techniques that are commonly employed in papermaking to apply the sizing composition to the cellulose-based product. For instance, the aqueous sizing composition may be applied to the surface of the paper using a size press by a calender or a doctor knife blade. Alternatively, the size composition may be sprayed onto the paper web or be applied by dipping the paper into the aqueous composition. The sizing composition also may be applied as part of the paper conversion process using conventional coating techniques. Paper treated with the sizing solution is then dried at elevated temperatures. Drying the paper web is sufficient to bring the surface size and surface strength to full development.

Thus, surface size treatment can be applied to paper as either a post-production operation or as a portion of the papermaking process itself. Surface size is applied typically in the papermaking process after the paper sheet has been formed and dried but not passed through a calendar stack. The formed and dried sheet (web) is conducted through a size press (actually a nip-coater of various configurations), which re-wets the sheet to some degree (depending on the type of size press) with the sizing composition. Upon the wetting or coating of the web, it is again dried and subsequently passed through a series of nips at the calendar to control caliper and smooth the finished sheet prior to wind-up and slitting or sheeting.

The sizing composition disclosed herein also may be used in conjunction with or serially with other additives conventionally used in the production of cellulose-based products. Such additional additives may include, but are not necessarily limited to, inorganic fillers, anti-curl agents, or additional conventional components such as a surfactant, plasticizer, humectant, defoamer, UV absorber, light fastness enhancer, polymeric dispersant, dye mordant, optical brightener, or leveling agent, as are commonly known in the art.

The paper onto which the sizing composition is applied may vary widely and is independent of the kind of pulp used to make the paper. The paper may be a paper base produced by sheeting under the wide pH ranges of 4 to 9. Thus, the sizing compositions disclosed herein are suitable for the preparation of sized paper of any thickness and of any kind and thus applies to papers or cardboards obtained from mechanical, chemical, soda, sulphite, sulphate, semichemical, wood, natural vegetable, rag or old paper pulp and mixtures thereof.

The paper also may contain additives such as fillers, dyestuffs, paper strengthening agents, drainage rate improvers, and internal sizing agents. The surface sizing of previously internally sized paper is specifically contemplated. In particular, by using the sizing compositions in connection with a sheet that has been internally sized, that is, certain sizing agents have been added to the pulp suspension before it is converted to a paper sheet, one may obtain higher levels of surface sizing Internal sizing tends to prevent or retard the surface size from soaking into the sheet, thus allowing it to remain on the surface where it has maximum effectiveness and may permit a lower surface size application rate at equivalent surface properties.

The following examples provide illustrative embodiments of the present invention and are not intended as a limitation on the scope of the invention. Unless otherwise indicated, all parts and percentages are by weight.

In the following examples sizing performance was measured using a water absorbency drop test according to the following general procedure: water (pH 7) was applied to paper using a micro syringe (5.0 microliters) to form one drop on the paper. The time period in which the water drop completely absorbed into the paper was measured in seconds and is reported for each example below.

EXAMPLE 1

Comparative Example (EAA—Potassium Hydroxide)

In a two liter stirred reactor with a condenser are charged 1282 g of deionized water (DI water), 76 g of a potassium hydroxide solution (50% by weight KOH) and 240 g of an ethylene-acrylic acid copolymer (EAA—20 weight % acrylic acid, available commercially from the Dow Chemical Company as Primacor™ 5990I). The EAA copolymer is dissolved after 4 hours of stirring at 95° C. The so-prepared EAA copolymer solution (16.55 weight % solids) is used to prepare a size press solution. To 100 parts by weight of an aqueous starch solution, containing 6% by weight starch (Penford 280), as surface sizing agent, is added a sufficient amount of the EAA copolymer solution to provide about 3% EAA solids based on starch solids. The resulting sizing solution is applied to a standard newsprint grade paper at 3 pounds of EAA solids per ton of paper. The water drop value of the sized paper was measured at 40 seconds

EXAMPLE 2

Comparative Example (SMA—Ammonium Hydroxide)

In a two liter pressured reactor are charged 1308 g of DI water, 52 g of an ammonium hydroxide solution (29 weight % $NH_3$) and 139 g of a styrene-maleic anhydride copolymer (SMA—26 weight % maleic anhydride with a molecular weight about 120,000). The SMA copolymer is dissolved after 4 hours at 95° C. at about 10 psig. The SMA copolymer solution (10.2 weight % solids) is used to prepare a size press solution. To 100 parts by weight of an aqueous starch solution, containing 6% by weight starch (Penford 280), as surface sizing agent, is added a sufficient amount of the SMA copolymer solution to provide about 3% SMA solids based on starch solids. The resulting sizing solution is applied to a standard newsprint grade paper at 3 pounds of SMA solids per ton of paper. The water drop value of the sized paper was measured at 240 sec.

EXAMPLE 3

Comparative Example (SMA & SAE)

A stirred reactor with a condenser was purged with nitrogen and charged with 500 parts of 10% by weight solution of a styrene-maleic anhydride copolymer (amide-ammonium salt of styrene/maleic acid copolymer with about 26% by weight maleic anhydride content and an 80,000 molecular weight), and 2 parts of an abietic acid-fumaric acid adduct (NovaFlo® 072G43, available from Georgia-Pacific). Nitrogen purge was continued as the solution in the reactor was stirred.

A mixture of monomers and an aqueous solution were prepared separately. The monomer mixture was 25 parts by weight styrene, and 25 parts by weight butyl acrylate. The aqueous initiator solution was 2 parts by weight ammonium persulfate in 40 parts DI water. Twenty parts by weight of the monomer mixture were charged into the reactor containing the SMA copolymer solution and the temperature was increased to 75° C. and maintained at this temperature. Then, 20 parts of the aqueous initiator solution were added. After 30 minutes reaction time at 75° C., the remainder of the ammonium persulfate solution was added at a rate of 20 parts per hour. Also, the remainder of the monomer solution was added simultaneously at a rate of 30 parts per hour. After all of the monomer solution was added (about one hour), the reactor was held at 75° C. for one additional hour. Then, the reactor was allowed to cool to room temperature and the characteristics and properties of the resultant latex (SMA-SAE dispersion) were measured.

The SMA-SAE dispersion (21% by weight solids) is used to prepare a size press solution. To 100 parts by weight of an aqueous starch solution, containing 6% by weight starch (Penford 280), as surface sizing agent, is added a sufficient amount of the SMA-SAE dispersion to provide about 3% SMA-SAE solids based on starch solids. The resulting sizing solution is applied to a standard newsprint grade paper at 3 pounds of SMA-SAE solids per ton of paper. The water drop value of the sized paper was measured at 749 seconds

EXAMPLE 4

SMA-EAA Blend from Separately Made Solutions 76.2 g of an SMA ammonia solution (approximately 10% by weight solids—Example 2) is blended with 23.8 g of a EAA potassium salt solution (approximately 16% by weight solids—Example 1) at room temperature for 15 minutes. The final solution shows a solids content of 11.2% by weight, a pH of 9.9 and a viscosity of 5 cPs. The SMA and EAA mixture is used to prepare a size press solution. To 100 parts by weight of an aqueous starch solution, containing 6% by weight starch (Penford 280), as surface sizing agent, is added a sufficient amount of the SMA-EAA copolymer blend solution to provide about 3% SMA-EAA solids based on starch solids. The resulting sizing solution is applied to a standard newsprint grade paper at 3 pounds of SMA-EAA solids per ton of paper. The water drop value of the sized paper was measured at 307 seconds

EXAMPLE 5

SMA-EAA Ammonium Hydroxide—One Step

In a two liter pressured reactor are charged 1200 g DI water, 50 g of an ammonium hydroxide solution (29% by weight ammonia), 165 g of an SMA copolymer (26% by weight maleic anhydride) and 28 g of an EAA copolymer (EAA—20 weight % acrylic acid, available commercially from the Dow Chemical Company as Primacor™ 5990I). SMA and EAA copolymers are dissolved after 4 hours at 95° C. and about 10 psig. The SMA plus EAA solution (12.7% by weight solids) is used to prepare a size press solution. To 100 parts by weight of an aqueous starch solution, containing 6% by weight starch (Penford 280), as surface sizing agent, is added a sufficient amount of the SMA-EAA copolymer blend solution to provide about 3% SMA-EAA solids based on starch solids. The resulting sizing solution is applied to a standard newsprint grade paper at 3 pounds of SMA-EAA solids per ton of paper. The water drop value of the sized paper was measured at 257 seconds

EXAMPLE 6

SMA-EAA Ammonium and Potassium Hydroxides—One Step

In a two liter pressured reactor are charged 1190 g DI water, 62 g of an ammonium hydroxide solution (29% by weight ammonia), 10 g of a potassium hydroxide solution (50% by weight KOH), 165 g of an SMA copolymer (26% by weight maleic anhydride) and 28 g of an EAA copolymer (EAA—20 weight % acrylic acid, available commercially from the Dow Chemical Company as Primacor™ 5990I). SMA and EAA copolymers are dissolved after 4 hours at 95° C. and about 10 psig. The SMA plus EAA solution (12.8% solids by weight) is used to prepare a size press solution. To 100 parts by weight of an aqueous starch solution, containing 6% by weight starch (Penford 280), as surface sizing agent, is added a sufficient amount of the SMA-EAA copolymer blend solution to provide about 3% SMA-EAA solids based on starch solids. The resulting sizing solution is applied to a standard newsprint grade paper at 3 pounds of SMA-EAA solids per ton of paper. The water drop value of the sized paper was measured at 241 seconds. In addition to their effective sizing performance, SMA-EAA copolymer solutions tend to be less foaming than SMA solutions and because they tend to exhibit a lower viscosity at an equivalent level of solids, SMA-EAA copolymer solutions usually can be prepared at a higher solids concentration

EXAMPLE 7

SMA-EAA-SAE Dispersion

A stirred reactor with a condenser was purged with nitrogen and charged with 500 parts by weight of 12.5% by weight solution of SMA and EAA copolymers (made according to Example 6). Nitrogen purge was continued as the solution in the reactor was stirred.

A mixture of monomers and an aqueous initiator solution were prepared separately. The monomer mixture was 40 parts by weight styrene and 40 parts by weight butyl acrylate. The initiator solution was 1 parts ammonium persulfate in 40 parts DI water. Twenty parts of the monomer mixture were charged to the SMA-EAA copolymer solution in the reactor and the temperature was increased to 75° C. and maintained at this temperature. Then, 20 parts of the aqueous initiator solution were added. After 30 minutes reaction at 75° C., the remainder of the ammonium persulfate solution was added at a rate of 20 parts per hour. Also, the remainder of the monomer solution was added simultaneously at a rate of 60 parts per hour. After all of the monomer solution was added (about one hour), the reactor was held at 75° C. for one additional hour. Then, the reactor was allowed to cool to room temperature and the characteristics and properties of the resultant latex (SMA-EAA-SAE dispersion) were measured.

The SMA-EAA-SAE dispersion (22% solids by weight) is used to prepare a size press solution. To 100 parts by weight of an aqueous starch solution, containing 6% by weight starch (Penford 280), as surface sizing agent, is added a sufficient amount of the SMA-EAA-SAE copolymer dispersion to provide about 3% SMA-EAA-SAE solids based on starch solids. The resulting sizing solution is applied to a standard newsprint grade paper at 3 pounds of SMA-EAA-SAE solids per ton of paper. The water drop value of the sized paper was measured at 895 seconds

EXAMPLE 8

Imidized SMA in the Presence of EAA

In a two liter pressured reactor are charged 1350 g DI water, 91 g of an ammonium hydroxide solution (29% by weight ammonia), 300 g of an SMA copolymer (26% by weight maleic anhydride, 80,000 molecular weight) and 51 g of an EAA copolymer (EAA—20 weight % acrylic acid, available commercially from the Dow Chemical Company as Primacor™ 5990I). Imidized SMA and EAA copolymers are obtained after 9 hours of heating at 105° C. and a pressure of about 15 psig. The dispersion (20% by weight solids) is used to prepare a size press solution. To 100 parts by weight of an aqueous starch solution, containing 6% by weight starch (Penford 280), as surface sizing agent, is added a sufficient amount of the imidized SMA-EAA copolymer dispersion to provide about 3% imidized SMA-EAA solids based on starch solids. The resulting sizing solution is applied to a standard newsprint grade paper at 3 pounds of imidized SMA-EAA solids per ton of paper. The water drop value of the sized paper was measured at 810 seconds.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof.

Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A sizing composition comprising a blend of an anionic styrene-maleic acid copolymer and an anionic ethylene-acrylic acid copolymer, wherein the anionic ethylene-acrylic acid copolymer is present in an amount of about 5 weight percent to about 45 weight percent, based on a combined weight of the anionic styrene-maleic acid copolymer and the anionic ethylene-acrylic acid copolymer.

2. The sizing composition of claim 1, wherein the styrene-maleic acid copolymer comprises about 50 weight percent to about 85 weight percent styrene.

3. The sizing composition of claim 1, wherein the styrene-maleic acid copolymer has a molecular weight of about 5,000 to about 200,000.

4. The sizing composition of claim 1, wherein the ethylene-acrylic acid copolymer has a molecular weight of about 2,000 to about 250,000.

5. The sizing composition of claim 1, wherein the styrene-maleic acid copolymer comprises styrene-maleic acid partially imidized.

6. The sizing composition of claim 5, wherein a degree of styrene-maleic acid imidization is about 25% to about 75% maleic acid units.

7. The sizing composition of claim 1, wherein the blend further comprises a styrene-acrylic ester dispersion (SAE).

8. The sizing composition of claim 7, wherein a ratio of the styrene-maleic acid copolymer and the ethylene-acrylic acid copolymer to the styrene-acrylic ester dispersion (SAE) is about 0.1:1 to about 10:1.

9. The sizing composition of claim 2, wherein the blend has a solids particle size of 0.01 micrometers to 2.0 micrometers, a pH of about 7.5 to about 10, and a solids content of 15 weight percent to 50 weight percent.

10. A sizing composition comprising:
a blend of a styrene-maleic acid copolymer and an ethylene acrylic acid copolymer, wherein the styrene-maleic acid copolymer comprises about 50 weight percent to about 85 weight percent styrene, the styrene-maleic acid copolymer has a molecular weight of about 5,000 to about 200,000, and the ethylene acrylic acid copolymer has a molecular weight of about 2,000 to about 250,000 and comprises about 5 weight percent to about 45 weight percent acrylic acid, and wherein the ethylene acrylic acid copolymer is present in an amount of about 5 weight percent to about 45 weight percent, based on a combined weight of the styrene-maleic acid copolymer and the ethylene acrylic acid copolymer.

11. The sizing composition of claim 10, wherein styrene-maleic acid copolymer is partially imidized.

12. The sizing composition of claim 11, wherein a degree of styrene-maleic acid imidization is about 25% to about 75% maleic acid units.

13. The sizing composition of claim 10, wherein the blend further comprises a styrene-acrylic ester dispersion (SAE).

14. The sizing composition of claim 13, wherein a ratio of the styrene-maleic acid copolymer and the ethylene acrylic acid copolymer to the styrene-acrylic ester dispersion (SAE) is about 0.1:1 to about 10:1.

15. The sizing composition of claim 10, wherein the blend has a solids particle size of 0.01 micrometers to 2.0 micrometers, a pH of about 7.5 to about 10, and a solids content of 15 weight percent to 50 weight percent.

16. The sizing composition of claim 1, wherein the anionic ethylene-acrylic acid copolymer is present in an amount of about 5 weight percent to about 33 weight percent, based on the combined weight of the anionic styrene-maleic acid copolymer and the anionic ethylene-acrylic acid copolymer.

17. The sizing composition of claim 1, wherein the ethylene-acrylic acid copolymer is present in an amount of about 16 weight percent to about 33 weight percent, based on the combined weight of the anionic styrene-maleic acid copolymer and the anionic ethylene-acrylic acid copolymer.

18. The sizing composition of claim 10, wherein the ethylene acrylic acid copolymer is present in an amount of about 5 weight percent to about 33 weight percent, based on the combined weight of the styrene-maleic acid copolymer and the ethylene acrylic acid copolymer.

19. The sizing composition of claim 1, further comprising a solubilizing compound, wherein the solubilizing compound comprises ammonia, monoethanolamine, diethanolamine, triethanolamine, or a mixture thereof.

20. A method for the surface sizing of a fabricated cellulosic product comprising applying the sizing composition of claim 1 onto a surface of the fabricated cellulosic product and then heating the fabricated cellulosic product.

21. A method for the surface sizing of a fabricated cellulosic product comprising applying the sizing composition of claim 10 onto a surface of the fabricated cellulosic product and then heating the fabricated cellulosic product.

* * * * *